A. D. Strong,

Vinegar Apps.

No. 4,051. Reissued June 28. 1870.

Inventor
A. D. Strong
per Burridge & Co
Attorneys

Witnesses
J. H. Burridge
D. L. Humphrey

N. PETERS, PHOTO-LITHOGRAPHER, WASHINGTON, D. C.

United States Patent Office.

ABNER D. STRONG, OF ASHTABULA, OHIO.

*Letters Patent No.* 97,987, *dated December*, 14, 1869; *reissue No.* 4,051, *dated June* 28, 1870.

IMPROVEMENT IN VINEGAR APPARATUS.

The Schedule referred to in these Letters Patent and making part of the same.

Be it known that I, ABNER D. STRONG, of Ashtabula, in the county of Ashtabula and the State of Ohio, have invented certain new and useful Improvements in Vinegar Apparatus, of which the following is a description.

Figure 1:
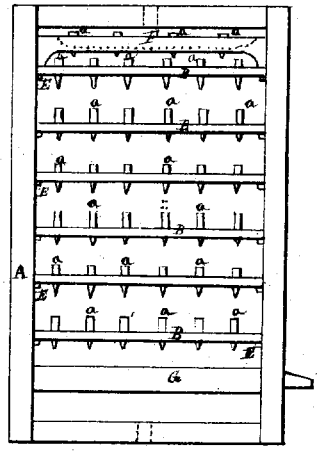

Figure 1 is a front view of the inside of the apparatus.

Figure 2:
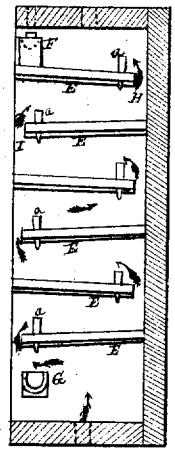

Figure 2, a side view of the same.

Figure 3:
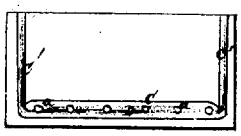

Figure 3, a detached section.

Like letters of reference refer to like parts in the different views.

This invention has for its object the conversion of cider, diluted spirits, or other like liquids into vinegar, by causing the same to flow over broad surfaces, consisting of a series of shelves, and, at the same time, causing it to be exposed to and brought in contact with the air, as hereinafter described.

In fig. 1—

A represents an oblong square case or box, in which is arranged a series of shelves, B, one above the other, in the order as shown.

A detached view of one such shelf is shown in fig. 3, in which it will be seen that along one edge and both ends thereof is cut a channel or groove C C′.

Said shelves are all constructed alike, and in the front channel or groove, C, is bored a series of holes, D, in which are loosely inserted pins, *a*, which pass through the shelf and extend below it, as seen in figs. 1 and 2.

The length of each shelf is such as to fit in between the sides of the case A and rest upon the cleats E, attached to the sides, as seen in fig. 1. The width of the shelves is a little narrower than the depth of the case along the line of the cleats, thereby allowing a space between the side of each alternate shelf and the back and front side of the case, to admit the passage of air in the opposite direction from that in which the fluid flows, as indicated by the arrows in fig. 2.

The distributer F is constructed of wood, in a suitable form, and of the same length as the shelves. Said distributer is simply a trough, with both ends closed and arranged longitudinally with the shelves. Through the bottom of said trough is bored a series of holes, in which pins are loosely inserted so that they project through and beyond the bottom.

The gatherer G is a wooden trough, arranged parallel with the length of the shelves, and immediately under the lower one in the series, from which it receives the fluid as it drips therefrom, and which it conducts to the outside, discharging into a suitable reservoir.

The relative size and proportion of the case, shelves, and other parts of the apparatus, should be made to suit the convenience and amount of work to be done by the person using it. The size which I prefer for ordinary use has thirty-two shelves, eight by fourteen inches, provided with a distributer and gatherer, and the case about six feet high.

On the inside of the case above mentioned are secured cleats E, fig. 2, on which the shelves rest, and are so arranged as to be slightly inclined, just enough to cause the fluid to flow toward and into the grooves C of each shelf.

The side grooves C′, as seen in fig. 3, are to prevent the fluid from passing over the ends of the shelf.

The distributer F is placed near the top of the case over the highest point of the first shelf. Said distributer is supported on cleats or otherwise, allowing a space between it and the first shelf below. Said shelf is also supported on cleats or by other similar means, and slightly inclined to allow the fluid to flow across the shelf from its highest side into the grooves C. The fluid is first conveyed through an opening at the top into the trough F, from which it passes through the holes with pins, *a*, to the first shelf below, across which it flows to the groove C, then through the holes in the bottom of the groove, regulated by the pins, onto the highest point of the shelf next below, where it again flows back across the shelf to the groove in which are similar holes and pins, through and from which it drips to the next shelf in order, in a reverse direction to the arrows, fig. 2, and so on down through the entire series, be they more or less in number, until the fluid reaches the gatherer or trough G.

The several shelves are narrower than the inside of the box, for the purpose of allowing a free passage of air through from the bottom to the top of the case. The shelves are so arranged as to allow a space between the side thereof, having the groove and pins and the back and front of the case.

Thus, if the said open space at the side of one shelf is at the back at H, the space in the next above or that below will be in front at I. Hence, alternately, the space will be at the front and back of the inside of the case, which will admit a current of air to pass in from an opening at the bottom of the case and between the shelves, and out at an opening at the top, as indicated by the arrows, fig. 2.

It will be obvious that, by this arrangement of shelves, pins, and air-passages, the cider and other vinegar-fluids, in passing over them, is diffused over a large surface, and thereby exposed more directly and intimately to the acidifying principle of the air, and thus facilitating its absorption of oxygen and the formation of acetic acid. Hence the chemical change of the cider or other vinegar-fluids to that of vinegar is accomplished in a short time, and the close case prevents the great loss by evaporation attending the ordinary mode or process. Also, by means of this arrangement, the temperature may be regulated more conveniently.

The apparatus, after being in use for a time, becomes surcharged with the acetic acid, by the shelves and pins becoming saturated therewith. In consequence thereof, the transmutation of cider to vinegar is greatly facilitated, and the process being conducted in a close case, it is accomplished with neatness and an avoidance of insects.

*Claims.*

What I claim as my improvement, and desire to secure by Letters Patent, is—

1. A vinegar apparatus, constructed with slanting shelves B, provided with marginal grooves or channels C C′, pins *a*, and case A, in the manner substantially as described, and for the purpose set forth.

2. The combination of the shelves B, provided with pins, the air-passages and case A, arranged substantially as and for the purpose specified.

ABNER D. STRONG.

Witnesses:
J. H. BURRIDGE,
D. L. HUMPHREY.